US006580727B1

(12) United States Patent
Yim et al.

(10) Patent No.: US 6,580,727 B1
(45) Date of Patent: Jun. 17, 2003

(54) ELEMENT MANAGEMENT SYSTEM FOR A DIGITAL SUBSCRIBER LINE ACCESS MULTIPLEXER

(75) Inventors: Susan Yim, Plano, TX (US); Xiaolin Lu, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/378,139

(22) Filed: Aug. 20, 1999

(51) Int. Cl.$^7$ ............................................... H04L 12/66
(52) U.S. Cl. ....................................... 370/463; 370/535
(58) Field of Search ................................ 370/401, 402, 370/403, 404, 405, 463, 535, 536, 537, 538, 540, 542, 543, 544, 465

(56) References Cited

U.S. PATENT DOCUMENTS 6,137,839 A * 10/2000 Mannering et al. ......... 370/210
6,359,881 B1 * 3/2002 Gerszberg et al. .......... 370/354
6,404,861 B1 * 6/2002 Cohen et al. ............ 379/90.01

* cited by examiner

*Primary Examiner*—Kwang Bin Yao
(74) *Attorney, Agent, or Firm*—Dana L. Burton; W. James Brady, III; Frederick J. Telecky, Jr.

(57) ABSTRACT

An access multiplexer (10) for a digital subscriber line (DSL) communications network, having element management system (EMS) capability, is disclosed. A host computer (17) is coupled to the DSL access multiplexer (DSLAM) (10) over a serial interface (27, 28). A controller (25) of the DSLAM includes an EMS agent (60) for receiving command control and information request messages from the host computer (17) over the serial interface (27, 28). The EMS agent (60) issues signals to a software process, such as the DSL channel manager (38*c*) in response to such messages, and generates replies to the host computer (17) over the serial interface (27, 28) upon execution of the requested operation. The controller (25) also operates in response to command control and information request messages initiated at user computers (U) that reside on a network (14). A Simple Network Management Protocol (SNMP) agent (62) executed by the controller (25) receives SNMP messages over the network (14), and initiates the execution of a method routine (72) to obtain the requested information or effect the corresponding control. As a result, both a local host computer (17) and also users on a network (14) may monitor, manage, and control the operation of the DSLAM (10).

16 Claims, 6 Drawing Sheets

ELEMENT MANAGEMENT SYSTEM FOR A DIGITAL SUBSCRIBER LINE ACCESS MULTIPLEXER

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention is in the field of data communications, and is more particularly directed to the architecture, operation, and control of access multiplexers for effecting such communications.

In recent years, the data rates at which communications are carried out over conventional telephone networks and wiring have greatly increased. These increases are due, in large part, to newly adopted techniques of multiplexing and modulating signals representative of the messages or data being communicated, resulting in greatly improved communication bandwidth. In addition, the carrier frequencies at which such communications are being carried out have also increased in recent years, further improving the bit rate.

These higher data rates are achieved in one relatively new type of current modem communications technology, referred to in the art as digital subscriber line ("DSL"). DSL refers generically to a public network technology that delivers relatively high bandwidth over conventional telephone company copper wiring, generally at limited distances. DSL has been further separated into several different categories of technologies according to specific expected data transfer rates, the types and lengths of the medium over which data are communicated, and schemes for encoding and decoding the communicated data. According to this technology, data rates between DSL modems may be far greater than current voice modem rates. Indeed, current DSL systems operate (or are projected to operate) at data rates ranging from on the order of 500 Kbps to 18 Mbps or higher. According to certain conventional techniques, such as the protocol referred to as Asymmetric Digital Subscriber Line (ADSL) and which corresponds to ANSI standard T1.413, the data communication rates are asymmetrical. Typically, the higher rate is provided for so-called downstream communications, that is from the telephone network central office to the customer modem, with upstream communication from the customer modem to the central office having a data rate considerably lower than the downstream rate.

An integral part of a DSL communications network is referred to in the art as the Digital Subscriber Line Access Multiplexer, or "DSLAM". DSLAMs are typically located at a central office of the telephone network, and include multiple DSL modem ports into which client modems may connect. The primary function of a DSLAM is to multiplex client data communications from its multiple DSL modem ports into a network, such as a local area network (LAN) which may include a server and an Internet gateway; return data communications from the network are also demultiplexed by the DSLAM for communication to the clients via the DSL ports.

Conventional DSLAMs are typically realized by way of multiple line cards, each of which supports one or more DSL ports. The communications received at the DSL ports are typically in packet form, each having headers or tails (or both) containing the appropriate routing information for the packet message. A DSLAM controller function performs the appropriate framing and data formatting by way of which the packets received at the DSL ports are conveyed, according to the appropriate protocols, to a network interface card (NIC) in the DSLAM and thus to the network. In general, conventional DSLAMs modulate and demodulate multiple DSL channels corresponding to multiple client locations, effect line concentration in the communications network, provide an interface to the communications network, and provide management of the communications system.

These important functions provided by DSLAMs in a communications network, particularly in a DSL environment, are relatively complex in nature, especially considering the high data rate communications that are supported. The design and realization of a DSLAM has therefore been relatively complex, particularly in terms of system analysis and debugging.

Furthermore, considering the line concentration function performed thereat, a typical DSLAM has access to the operating characteristics of many DSL channels, as well as bidirectional access to client modems. Heretofore, this access has not been fully utilized in the management and operation of the communications network.

BRIEF SUMMARY OF THE INVENTION

It is therefore an object of the present invention to provide a DSLAM having sufficient processing capability to effect element management system (EMS) functionality relative to multiple communications channels.

It is a further object of the present invention to provide such a DSLAM in which such a management system may be effected both locally, by a host computer coupled to the DSLAM, and also remotely by way of a network.

It is a further object of the present invention to provide such a DSLAM in which debugging of the DSLAM and its operation is facilitated by way of interface of a local host computer to the DSLAM.

It is a further object of the present invention to provide such a DSLAM that can update the operating software of client modems, under the control of a host computer or a network-linked computer.

Other objects and advantages of the present invention will be apparent to those of ordinary skill in the art having reference to the following specification together with its drawings.

The present invention may be implemented by way of a digital subscriber line access multiplexer (DSLAM), preferably implemented by way of digital signal processors (DSPs), and having an element management system agent operable thereupon. The element management system agent interfaces with a host computer, for example by way of a high speed serial interface, by way of which debugging, system management, user control, and other operations may be carried out upon the DSLAM.

According to another aspect of the present invention, the DSLAM includes a network interface agent, by way of which other computers, for example computers on a local area network with the DSLAM, may access and operate the element management system of the DSLAM, such that system management, user control, and other system functions may be initiated remotely for execution at the DSLAM.

DETAILED DESCRIPTION OF THE INVENTION

Figure 1:
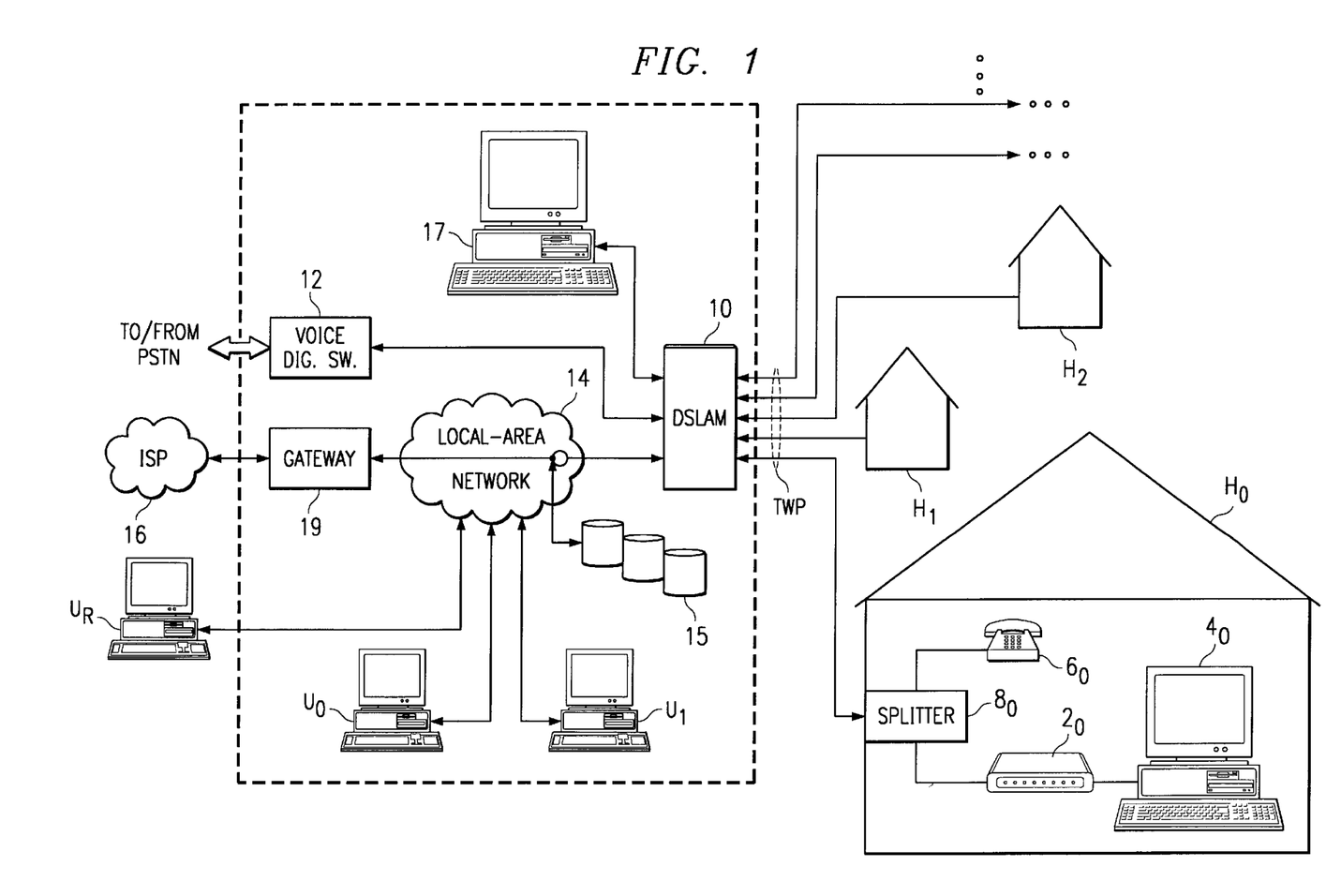
FIG. 1 is an electrical diagram, in block form, of a digital subscriber line (DSL) communications network into which the preferred embodiments of the present invention may be implemented.

Referring first to FIG. 1, a digital subscriber line (DSL) communications network into which the preferred embodiment of the present invention may be implemented will first be described. The preferred embodiment of the invention will be described in connection with a DSL network, as it is contemplated that the present invention is particularly beneficial when applied to DSL communications; of course, it is to be understood that the present invention may also have applicability to other types of communications, as will be readily apparent to those skilled in the art having reference to this specification. Further, the particular DSL network of FIG. 1 is described herein by way of example only, it being contemplated that those skilled in the art having reference to this specification will be readily able to realize the benefits of the present invention in DSL networks according to other arrangements and, as noted above, also in data communication according to other technologies.

The DSL communications network of FIG. 1 includes multiple client locations H, each of which may correspond to a home or an office client location. In this DSL arrangement, exemplary client location $H_0$ includes a DSL modem $2_0$ which handles communications to and from client computer $4_0$. Telephone handset $6_0$ is connected in parallel with DSL modem $2_0$ to splitter $8_0$ which, as is conventional in the art, provides the appropriate filtering operation to forward voice communications to handset $6_0$ and data communications to DSL modem $2_0$. Splitter $8_0$ is connected to one of local telephone network facilities TWP, each of which may be realized by way of conventional twisted-pair copper wires. Others of client locations H may be similarly constructed, or realized in such other fashion as is known in the art.

The example of FIG. 1 corresponds to the type of DSL communications in which analog voice signals travel at a lower frequency than data communications, permitting the simultaneous overlay of the two classes of traffic on the same telephone network facilities. Alternatively, as is known in the art, so-called "splitterless" DSL may be used, in which voice communications are received and converted by the DSL modem into packet communications, and communicated over the telephone network as digital packets in similar fashion as the communicated data. The present invention may be applied with equivalent benefit to DSL communications according to such splitterless technologies, as well.

In the example of FIG. 1, twisted-pair facilities TWP are connected to central office CO either directly, or as a combination of twisted-pair and fiber optic physical facilities, with repeaters and other network elements (not shown) provided as necessary for reliable communication. Where voice communications are involved, as in this example, central office CO will typically be located at a telephone provider site. Alternatively, DSL communications may be limited to data communications, in which case control office CO may be a server location, such as a public or proprietary (Internet or intranet) server location with which client locations H may communicate data, in which case the analog voice signal capability would likely not be present.

As shown in FIG. 1, each of twisted-pair facilities TWP is received by digital subscriber line access multiplexer (DSLAM) 10, the construction of which will be described in further detail hereinbelow relative to the preferred embodiments of the invention. In this example, DSLAM 10 is able to separate the voice signals from the data communications received over facilities TWP, and forward these signals to the public switched telephone network (PSTN) via voice digital switch 12, which also resides at central office CO; of course, voice communications from PSTN to a client location H, such as to handset $6_0$ at client location $H_0$, may also be handed by digital switch 12 and DSLAM 10, in the conventional manner.

For data communications, DSLAM 10 is in communication with a local network such as local area network (LAN) 14 at central office CO as shown in FIG. 1. LAN 14 may be arranged in the conventional fashion for LANs, as is well known in the art, such as an Ethernet network, over which communications may be carried out in the conventional manner. Such LANs are compatible with packet communication, as is well known. In the example of FIG. 1, local servers 15 reside on LAN 14, such that client locations H may access locally stored data therefrom via the DSL connection. Additionally, particularly in the telephone network application, Internet gateway 19 resides on LAN 14, such that client locations H may bidirectionally access the Internet via central office CO.

According to the preferred embodiment of the present invention, user computers U resident on LAN 14 are able to access DSLAM 10 in order to effect system management and monitoring functions, as will be described in further detail hereinbelow. The physical location of user computers U will depend upon the characteristics of LAN 14. User computers U directly connected to LAN 14 will typically be located within or near central office CO. Additionally, it is contemplated that other networks (such as other LANs) may be coupled to LAN 14, for example by way of a router or other remote access arrangement, permitting user computers U that are physically distant from central office CO to access LAN 14 and thus access DSLAM 10 by way of dial-up or other access techniques. Such remote access is shown in FIG. 1 by remote user computer $U_R$.

According to the preferred embodiment of the invention, DSLAM 10 is also connected to host computer 17. Host computer 17 is preferably a personal computer or workstation that is physically located near DSLAM 10, and that is used to access and control system management functions within DSLAM 10 as will be described in detail hereinbelow. In larger installations, it is contemplated that host computer 17 will typically be coupled to multiple similarly-constructed DSLAMs 10, rather than to a single DSLAM 10 as suggested by FIG. 1.

Figure 2:
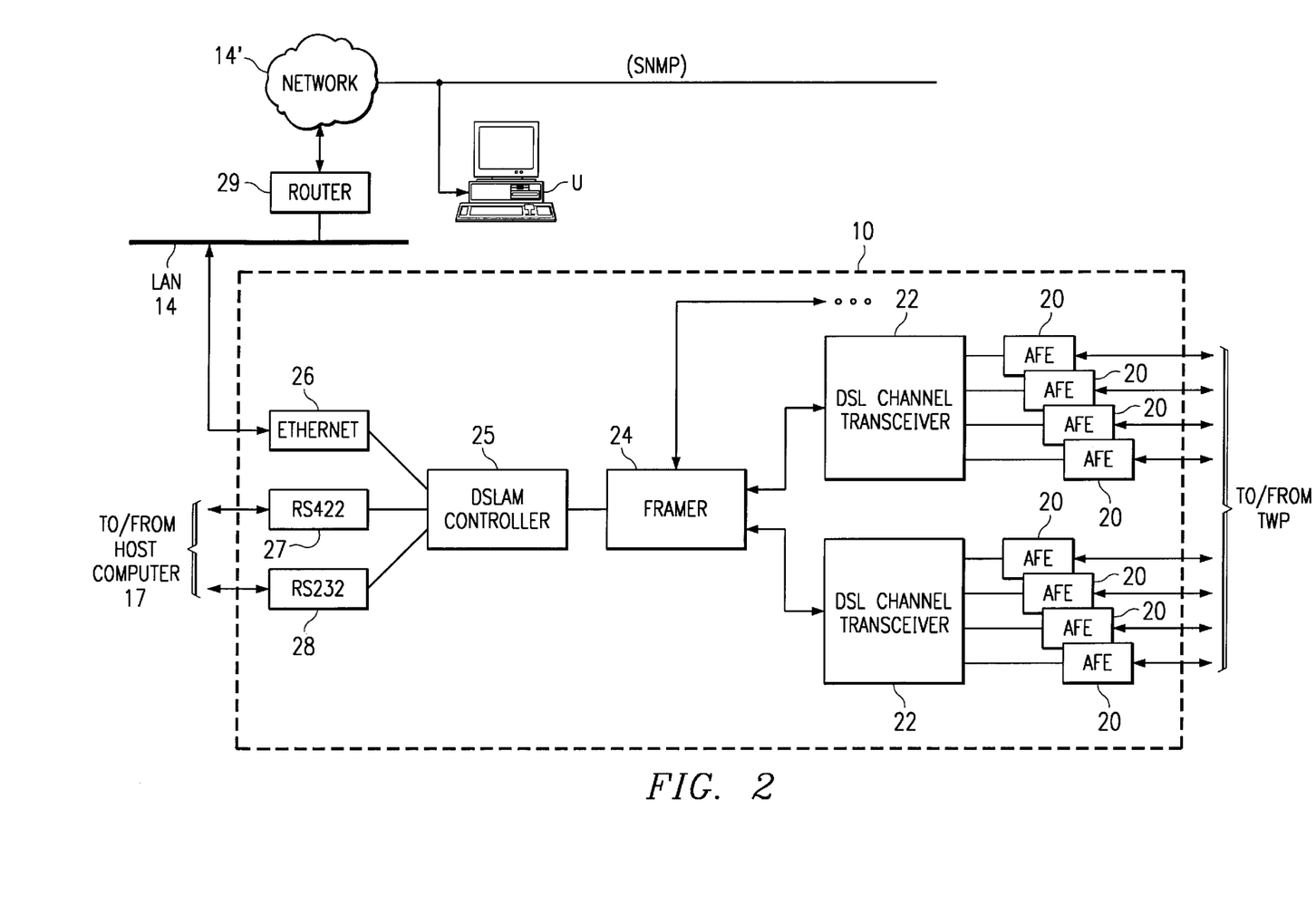
FIG. 2 is an electrical diagram, in block form, of a digital subscriber line access multiplexer (DSLAM) constructed according to the preferred embodiments of the present invention.

Referring now to FIG. 2, an exemplary hardware architecture of DSLAM 10 according to the preferred embodiments of the invention will now be described. As shown in FIG. 2, DSLAM 10 includes multiple analog front end (AFE) functions 20, each of which serve as a DSL port and thus bidirectionally connect to one of twisted pair facilities TWP, to receive communications from a connecting client location H. AFE functions 20 are constructed as circuit cards, including mixed-signal (i.e., involving both digital and analog operations) integrated circuits, to provide all loop interface and line driver functions necessary for full-duplex DSL communications. Examples of integrated circuits that may be used to realize AFE functions 20 include the TLV420AD12 central office ADSL codec, and THS6002 line driver, both available from Texas Instruments Incorporated.

DSL channel transceivers 22 of DSLAM 10 are each bidirectionally connected to multiple ones of AFE functions 20. In the example of FIG. 2, each DSL channel transceiver 22 connects to four AFE functions 20; of course, the specific number of AFE functions 20, and thus DSL channels, to be processed through a given one of DSL channel transceivers 22 will vary with the particular DSLAM architecture and also the processing capacity of the DSL channel transceivers 22. DSL channel transceivers 22 are each preferably a programmable digital device for executing the necessary signal processing operations for both transmission and receipt of the data payload. These operations include such functions as echo cancellation, encoding and decoding of the data into appropriate subchannels for transmission, and Fast Fourier Transform (FFT) signal processing between the frequency and time domains. Particularly at DSL data rates, the digital data processing capacity and power of DSL channel transceivers 22 is preferably of a high level, preferably with capability on the order of that provided as digital signal processors of at least the capability of TMS420CL548 DSPs available from Texas Instruments Incorporated. Each of DSL channel transceivers 22 are connected to framer function 24, which is also preferably implemented as a DSP such as the TMS420CL548 noted above. Framer function 24 performs the appropriate formatting of the digital data into the appropriate packets and frames for processing within DSLAM 10. While two DSL channel transceivers 22 are explicitly illustrated in FIG. 2, it is of course contemplated that any number of DSL channel transceivers 22 may feed (and be fed by) framer function 24, depending upon the particular architecture and capability of DSLAM 10.

DSLAM controller 25 is bidirectionally connected to framer function 24 on one side; on its network side, DSLAM controller 25 is bidirectionally connected to Ethernet network interface card (NIC) 26, RS422 high-speed serial interface 27, and RS242 serial interface 28. As shown in FIG. 1, Ethernet NIC 26 interfaces DSLAM 10 to LAN 14, and serial interfaces 27, 28 interface DSLAM 10 to host computer 17. In the communication of data to and from the DSL channels, DSLAM controller 25 performs the function of handling data flow control and channel management of the DSL channels connected to AFE functions 20 in DSLAM 10, as well as data flow control between the DSL channels and NIC 26, specifically in performing Layer 2 and Layer 3 network protocol processing according to various protocols such as PPP, IP routing, ARP, and the like. An example of a preferred approach to performing such network protocol processing is described in copending application Ser. No. 09/360,747, entitled "Efficient Packet Buffer Management in a Digital Subscriber Line Access Multiplexer", filed Jul. 26, 1999, commonly assigned herewith and incorporated hereinto by this reference.

According to the preferred embodiment of the present invention, another function carried out by DSLAM controller 25 is the control of the setup and operation of DSLAM 10, in response to control instructions from host computer 17 received via serial interfaces 27, 28, or from user computers U by way of Simple Network Management Protocol (SNMP) messages communicated over LAN 14 to Ethernet NIC 26. In the example of FIG. 2, control or information requests may be generated by user computer U as SNMP messages communicated over network 14' and, via router 28, over LAN 14 of DSLAM 10. Of course, user computers U that reside on LAN 14 will issue control and monitoring instructions by way of SNMP messages directly over LAN 14 to DSLAM 10. These control and management functions of DSLAM 10 according to the preferred embodiment of the invention, as initiated by host computer 17 or user computers U, will be described in further detail hereinbelow.

DSLAM controller 25 may be implemented as a single DSP device for performing the DSLAM controller functions described above, having capabilities such as the TMS420LC548 DSP available from Texas Instruments Incorporated, as noted above. Alternatively, in the event that higher processing capability DSPs, such as those of the TMS420C6x class of DSPs available from Texas Instruments Incorporated, are used for other functions in DSLAM 10 (i.e., framer function 24 and DSL channel transceivers 22), and if sufficient processing capacity remains available in that DSP to handle the functions of DSLAM controller 25, the digital functions of DSLAM 10 may then be realized in a single DSP device. Still further in the alternative, DSLAM controller 25 may, of course, be realized by way of dedicated custom logic circuitry. As such, the functional boundaries of DSLAM 10 shown in FIG. 1 may or may not represent the boundaries of integrated circuits used to realize these functions, depending upon the processing capacity of the particular circuits.

However, it is preferable that DSLAM controller 25 be realized as a DSP, preferably one compatible with such other DSPs as are used within DSLAM 10 as DSL channel transceivers 22 and framing function 24. This DSP realization of DSLAM controller 25 allows for data flow through DSLAM 10 without requiring data translation and other interface considerations that may otherwise be necessary if DSLAM controller 25 were realized as a general purpose microprocessor. Additionally, the DSP realization of DSLAM controller 25 also permits use of the same development platform for the operation of DSLAM controller 25 as for the other DSPs within DSLAM 10. Of course, as will become apparent to those skilled in the art having reference to this specification, many of the benefits of the present invention may also be realized even if DSLAM controller 25 is implemented by way of such a microprocessor or other hardware other than a DSP device.

Figure 3:
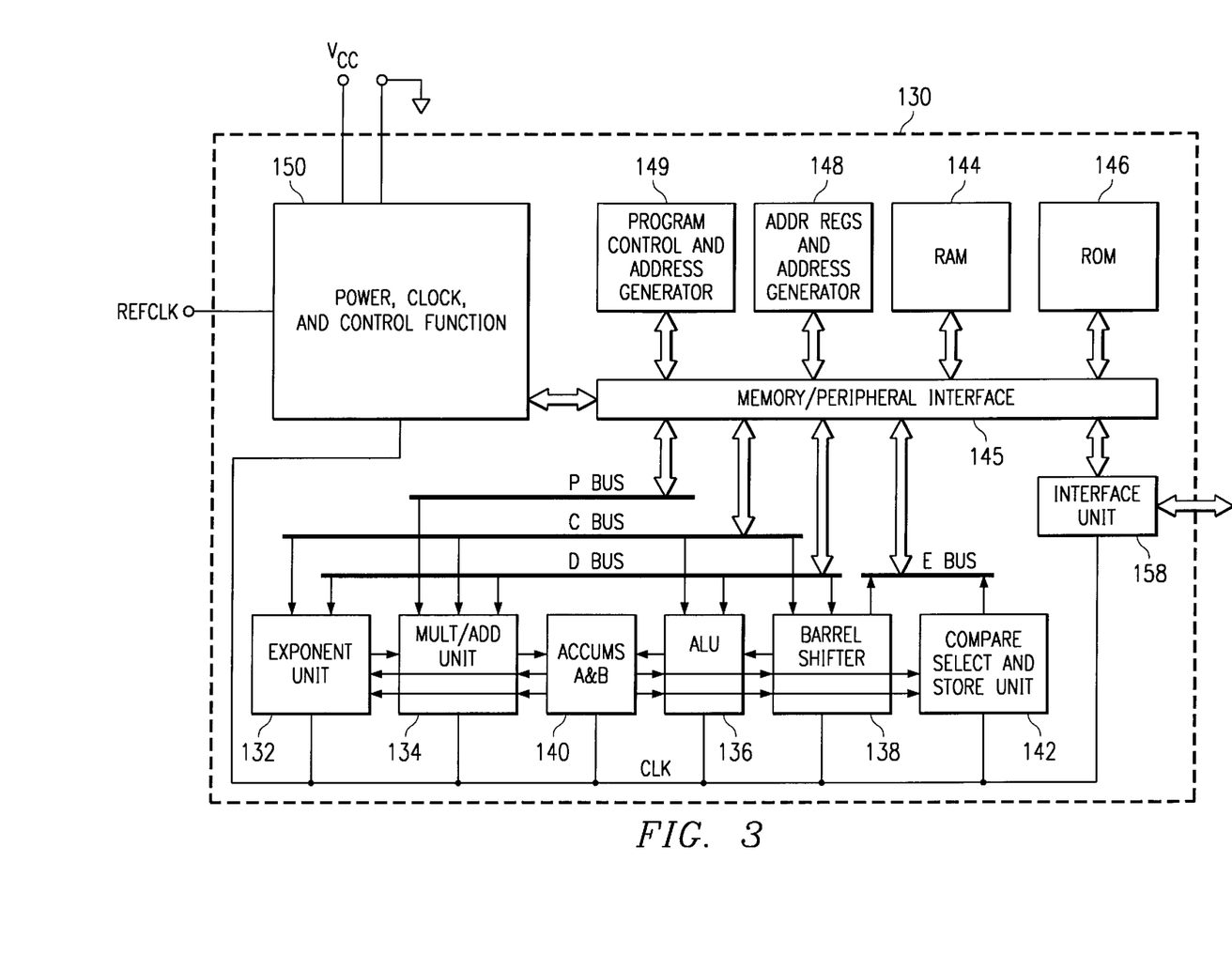
FIG. 3 is an electrical diagram, in block form, of the architecture of a digital signal processor (DSP) according to which the DSLAM controller of the preferred embodiments of the present invention may be implemented.

Referring now to FIG. 3, an exemplary architecture of DSP 130, according to which DSLAM controller 25 may be realized, will now be described in detail. The example of DSP 130 corresponds to the architecture of the above-noted TMS420LC548, it being understood that DSPs constructed according to other architectures may alternatively be utilized.

DSP 130 in this example is implemented by way of a modified Harvard architecture, and as such utilizes three separate data buses C, D, E that are in communication with multiple execution units including exponent unit 142, multiply/add unit 144, arithmetic logic unit (ALU) 136, barrel shifter 148. Accumulators 140 permit operation of multiply/add unit 144 in parallel with ALU 136, allowing simultaneous execution of multiply-accumulate (MAC) and arithmetic operations. The instruction set executable by DSP 130, in this example, includes single-instruction repeat and block repeat operations, block memory move instructions, two and three operand reads, conditional store operations, and parallel load and store operations, as well as dedicated digital signal processing instructions. DSP 130 also includes compare, select, and store unit (CSSU) 142, coupled to data bus E, for accelerating Viterbi computation, as useful in many conventional communication algorithms.

DSP 130 in this example includes significant on-chip memory resources, to which access is controlled by memory/peripheral interface unit 145, via data buses C, D, E, and program bus P. These on-chip memory resources include random access memory (RAM) 144, read-only memory (ROM) 146 used for storage of program instructions, and address registers 148. Program controller and address generator circuitry 149 is also in communication with memory/peripheral interface 145, and receives program instruction code from ROM 146 or from other storage via memory/peripheral interface 145, and generates control signals applied to each of the functional units of DSP 130 to control the execution of instructions corresponding to the received program instruction code. Interface unit 158 is also provided in connection with memory/peripheral interface 145 to control external communications. Power, clock and control function 150 refers, in general, to control circuitry within DSP 130 to handle such functions as power distribution and voltage regulation, clock generation, and overall control of DSP 130; additionally, power, clock and control function 150 may further realize other interface functions, such as serial and host ports, as well as additional control functions such as timers, JTAG test interface circuitry, built-in self test circuitry, and the like.

Figure 4:
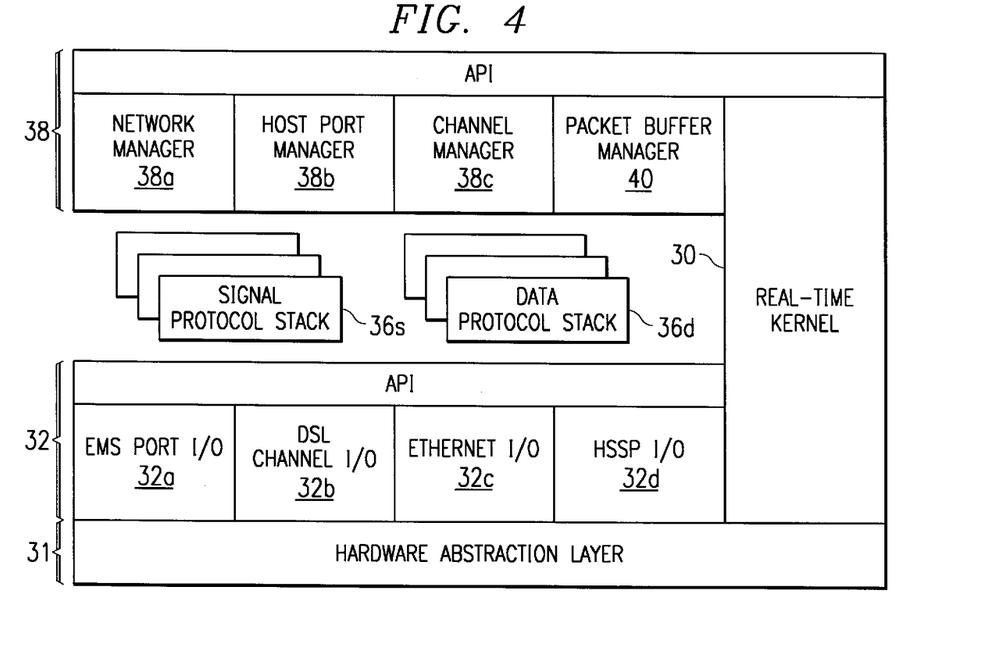
FIG. 4 is a block diagram illustrating the software architecture under which the DSLAM of FIG. 2 operates, according to the preferred embodiments of the present invention.

FIG. 4 illustrates the software architecture of DSLAM controller 25, as may be implemented by way of DSP 130 according to the preferred embodiment of the invention. The architecture of FIG. 4 is based upon real-time kernel 30, which includes functional components upon which the remainder of DSLAM controller 25 software is based. These components include a real-time scheduler, a standard I/O management system, and a packet-oriented memory management system according to the preferred embodiments of the present invention.

The real-time scheduler portion of real-time kernel 30, according to the preferred embodiment of the invention, uses priority-based event driven round robin scheduling to handle the asynchronous network interface data traffic and message transmissions passing through DSLAM 10 under the control of DSLAM controller 25. In this example, each event is described by an event descriptor data structure which indicate the type and priority of the event, along with event-specific notify values, flags, states, and information regarding the device and port with which the event is associated.

Relative to the standard I/O management system, hardware abstraction layer 31 includes the hardware dependent portions of driver software for each of the interface functions to which DSLAM controller 25 is responsive. The device drivers for the DSL channels supported by AFE functions 20 (FIG. 2), Ethernet interface via NIC 26, and serial port interfaces 27, 28, are preferably developed according to a standard I/O model. Application program interface (API) layer 32 resides "above" hardware abstraction layer 31, and includes an element management system (EMS) port I/O driver 32a, DSL channel I/O driver 32b, Ethernet I/O driver 32c, and HSSP (high-speed serial port) I/O driver 32d, as illustrated in FIG. 4. These drivers in API 32 interfaces to the protocol layer of the architecture, represented by signal protocol stack 36s and data protocol stack 36d in the architecture of FIG. 4.

Signal protocol stack 36s in the architecture of FIG. 4 is a protocol stack that is used primarily during initialization of communications between a DSL modem 2 at a client location H (FIG. 1) and DSLAM 10. Once a bidirectional channel has been established, data protocol stack 36d is used for the storage and processing of data packets and their associated overhead (i.e., headers and tails), as will be described below.

Above the protocol stack layer (36s, 36d), various system manager software applications reside in API layer 38 of the architecture of FIG. 4. Network manager 38a, host port manager 38b, and DSL channel manager 38c each provide a uniform API for top level applications in DSLAM controller 25, such top level applications including an element management system (EMS) agent, DSL channel IP routing, DSL channel PPP processing, ARP and SNMP protocols, and the like. More specifically, a data structure is provided by DSLAM controller 25 that describes the quality of service parameters of each DSL port handled by DSLAM 10, such quality of service parameters including bit error rate, signal-to-noise ratio, delay, data flow and data error controls, line coding, and the like. DSL channel manager 38c serves to initialize and drop DSL channels in its opening and closing of a port, and also to set up and modify the quality of service parameters in the associated data structure, along with setting and modifying the data rates for upstream and downstream traffic. Network manager 38a and host port manager 38b handle communications through their respective ports, in the conventional manner and also as described herein. Manager applications 38a, 38b, 38c all share a common code base for standard I/O management functions, as noted above, while providing device-specific management functions.

In operation, data packets received and retransmitted through DSLAM controller 25 effectively make their way through the software architecture of FIG. 4. For example, a DSL message received by one of AFE functions 20 (FIG. 2) is received as a group of packets by hardware abstraction layer 31, and is then handled by DSL channel I/O driver 32b, which places the packets into data protocol stack 36d. The packets in data protocol stack 36d are processed by packet buffer manager 40 according to the various protocols, and then handled off to the API layer for processing by the associated manager application according to the particular destination of the message. Once the appropriate manager application 38a, 38b, 38c performs its processing, the packet is then forwarded back through data protocol stack 36d to the appropriate I/O driver 32 for the packet destination.

As illustrated in FIG. 4, the software architecture of DSLAM controller 25 preferably includes packet buffer manager 40. Packet buffer manager 40 corresponds to a group of program instructions that, when executed by DSP 130 as DSLAM controller 25 described above, executes a packet-based memory management system for a multi-protocol, multi-channel DSL communications system such as DSLAM 10. The above-incorporated copending application Ser. No. 09/360,747 describes the operation of a preferred realization of packet buffer manager 40, according to which DSLAM controller 25 processes each block of data through a series of different network interfaces, protocols, and associated processing, while maintaining the contents of the data block in place in memory, effecting a zero-copy packet buffer manager system. In any case, the program instructions of packet buffer manager 40 are preferably stored in ROM 146 of DSP 130 used to implement DSLAM controller 25, executed by way of access to on-chip RAM 144 which stores the data packets and any associated overhead.

Referring back to FIGS. 1 and 2, and as noted above, DSLAM controller 25 carries out various management and monitoring functions relative to the overall setup and operation of DSLAM 10. According to the preferred embodiment of the invention, these functions are executed by DSLAM controller 25 in response to control instructions from host computer 17 received via serial interfaces 27, 28, or from user computers U communicated over LAN 14 via Ethernet NIC 26.

In this regard, DSLAM controller 25 either maintains, or can gather on request, certain management and monitoring information regarding the operation of DSLAM 10. This information includes the logging of events, errors, and alarms that are generated by DSLAM 10 itself, management information regarding the protocols, coding methods, channel types, and the like that are supported by DSLAM 10, overall system performance statistics, DSL channel behavior statistics, and the performance of central office and client modems. As will be described in further detail hereinbelow, these data will be utilized in the element management system (EMS) of the preferred embodiment of the present invention.

According to the preferred embodiment of the invention, an element management system (EMS) is realized in connection with DSLAM 10, through the combination of DSLAM controller 25 with a service application operating on host computer 17 or user computers U. This EMS provides the operators and users of DSLAM 10 with the ability to select DSL channel rates, channel types, and communications protocols to be used in the DSL communications, to debug channel operations, and to turn DSLAM 10 on and off. Additionally, it is contemplated that the EMS according to the present invention will provide the ability to download modem software to modems 2 at client locations H, such that updated modem communications software may be installed thereat.

Figure 5:
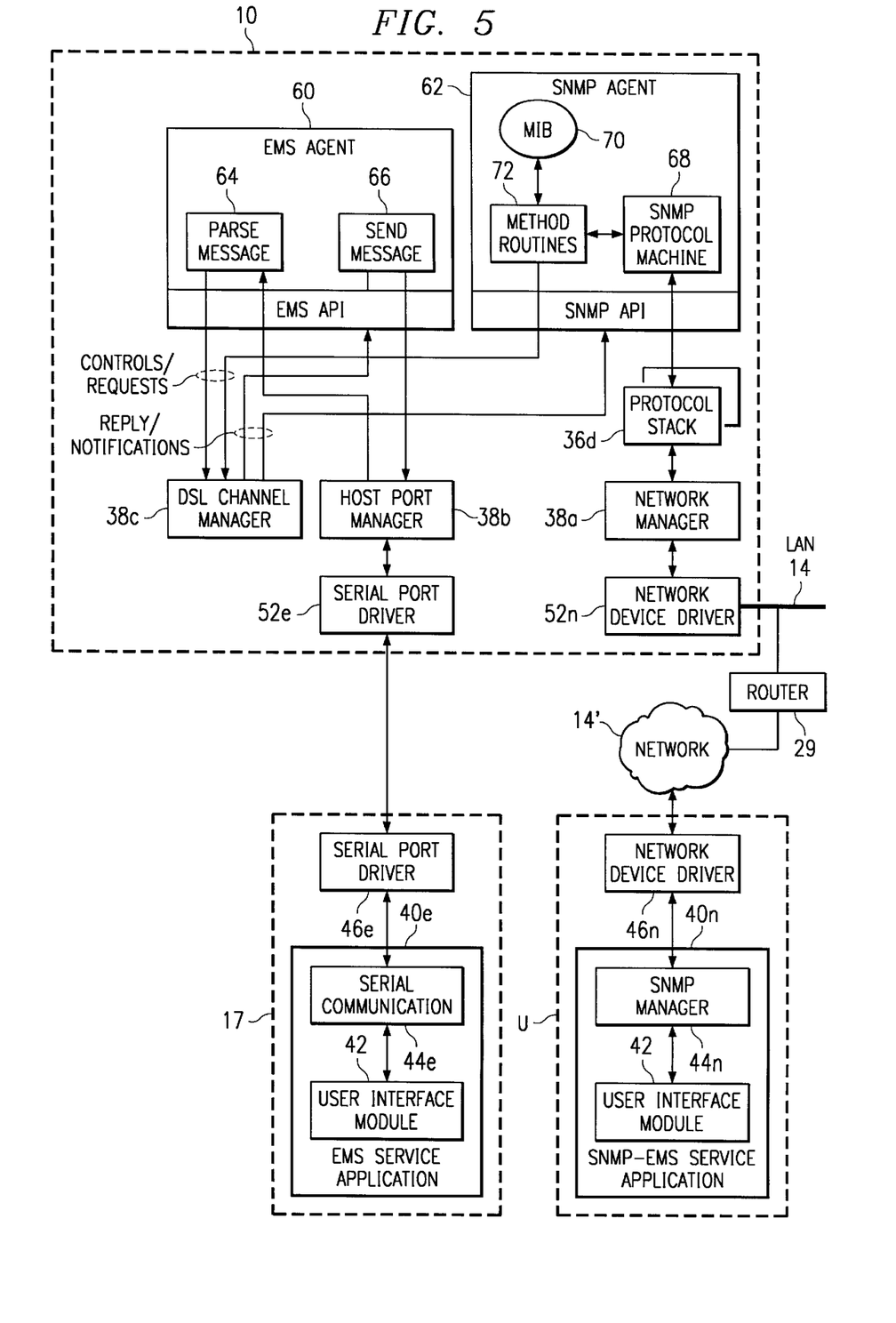
FIG. 5 is a block diagram illustrating the software architecture of the element management system (EMS) according to the preferred embodiment of the invention.

Referring now to FIG. 5, the overall software architecture of the EMS according to the preferred embodiment of the present invention will now be described. It is contemplated that those of ordinary skill in the art having reference to this specification will be readily able to implement the functionality described hereinbelow upon DSLAM 10, host computer 17, and user computers U, regardless of their specific hardware realizations. As such, it is contemplated that the functional software architecture provided hereinbelow will provide clear and full description of the operation of the EMS system according to the preferred embodiment of the invention.

Host computer 17 includes EMS service application 40e, and each of user computers U includes SNMP-EMS service application 40n. EMS service application 40e of host computer 17 includes a user interface module 42 and a serial port communication module 44e for communicating with DSLAM 10 over its serial interfaces 27, 28, while SNMP-EMS service application 40n of user computer U includes user interface module 42 in combination with SNMP manager 44n, for communicating with DSLAM 10 over LAN 14 (directly or indirectly).

Within DSLAM 10, EMS agent 60 communicates with EMS service application 40e in host computer 17, and SNMP agent 62 communicates with SNMP-EMS service application 40n in user computers U. EMS agent 60 is a software agent that is executed by programmable circuitry within DSLAM 10, such as DSLAM controller 25, to handle EMS commands and requests from, and to send messages to, EMS service application 40e. EMS agent 60 communicates with host computer 17 by way of host port manager 38e, which in turn operates through serial port driver 52e to communicate with host computer 17 over one of serial interfaces 27, 28. SNMP agent 62 is a software agent that similarly responds to commands and requests of an EMS nature, via protocol stack 36d, network manager 38a, and network device driver 52n. Communications with user computers U are effected by network device driver 52n via Ethernet NIC 26 of DSLAM 10, over LAN 14 and (if present), router 29 and network 14'. The operation of EMS agent 60 and SNMP agent 62 will be described in further detail hereinbelow.

User interface module 42 in service applications 40e, 40n is, in each case, a software module that interacts with the human users of DSLAM 10 by way of a graphical user interface, and as such corresponds to a high-level application upon host computer 17 or user computers U, as the case may be. For example, in the case where host computer 17 and user computers U operate using the WINDOWS operating system, user interface module 42 will be implemented as a WINDOWS application; the respective serial communications module 44e and SNMP manager 44n are preferably implemented as dynamic link libraries (DLLs) in this arrangement.

Figure 6:
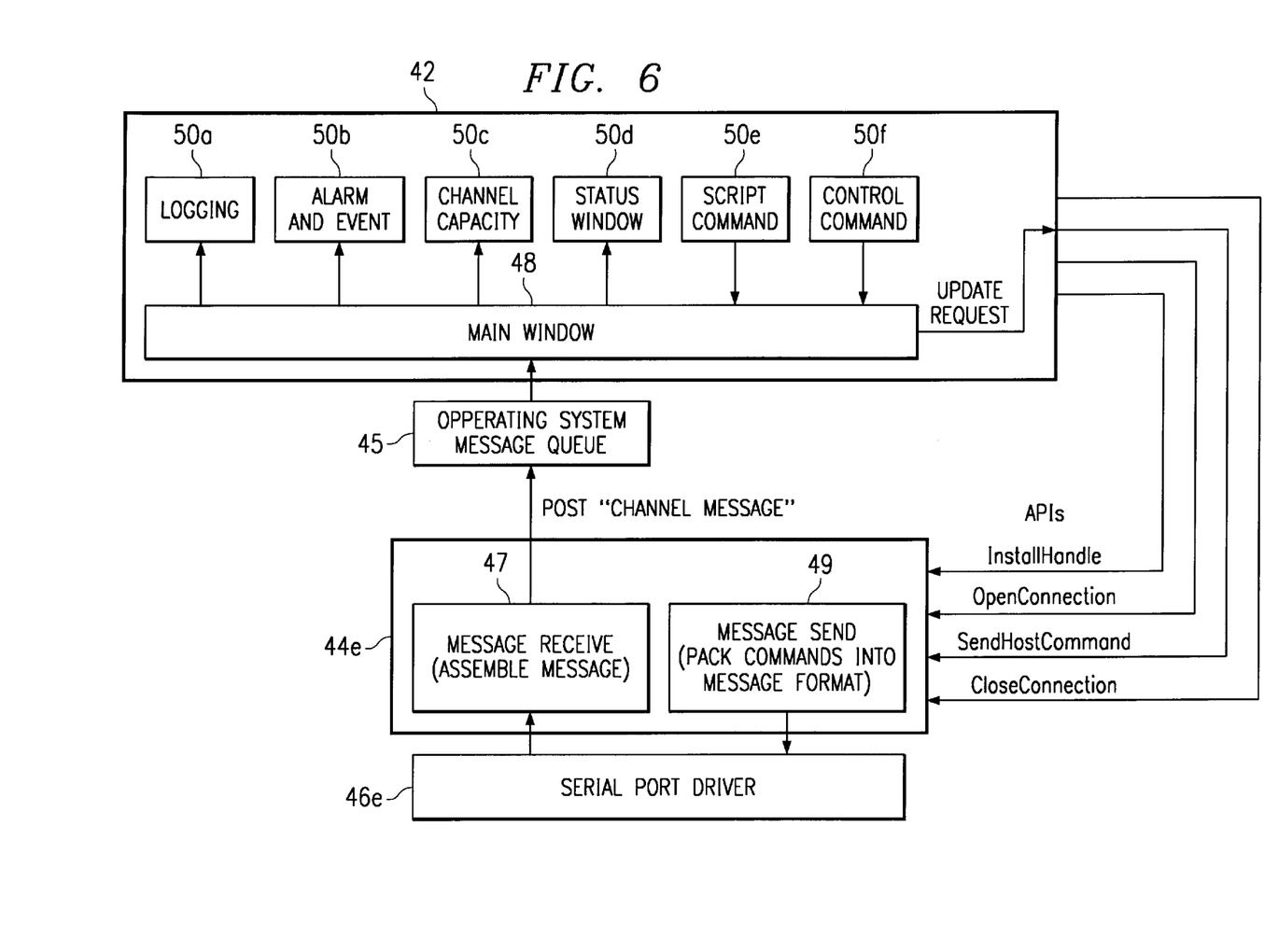
FIG. 6 is a block diagram illustrating the software architecture of the EMS service application implemented in a host computer according to the preferred embodiment of the invention.

User interface module 42 is preferably realized by way of an object-oriented technique in which classes are provided for conventional graphical user interface. Referring now to FIG. 6, the functional blocks of user interface module 42 according to the preferred embodiment of the invention will now be described. While the example of user interface module 42 is shown in FIG. 6 in connection with serial communications module 44e of EMS service application 40e, it is contemplated that the functional arrangement of user interface module 42 within SNMP-EMS service application 40n will be similarly implemented, having effectively the same windows, sub-windows, and functionality.

As shown in FIG. 6, user interface module 42 includes main window 48 and multiple sub-windows 50. Each sub-window 50 interacts with DSLAM 10 in response to requests from main window 48 generated from user inputs; in this regard, main window 48 preferably includes such graphical user interface features as toolbars, pull-down menus, dialogs, and the like. Sub-windows 50 are each preferably implemented as dialog boxes (e.g., by way of the Cdialog class of Microsoft defined classes in the Microsoft Foundational Class object-oriented technique). Depending upon the particular function of the sub-window 50, the dialog box may be modal (requiring its closing prior to accessing other sub-windows 50) or modeless (allowing its existence while other sub-windows 50 are subsequently opened).

Logging sub-window 50a is a modeless window that displays logging information generated by channel manager 38c or network manager 38a of DSLAM 10, depending upon the channel that is selected by the user via main window 48 or sub-window 50a. The logged information may be presented as a list for the selected channel, and may include an identification of the source of the channel, the type of messages being transmitted or received, and the information itself, which may be general channel information, error codes, or warning messages, depending upon the current state of the selected channel.

Alarm and event sub-window 50b is a modeless window that alerts the user of certain events and alarms encountered in the operation of DSLAM 10. Preferably, the user can register, with EMS agent 60 or SNMP agent 62 of DSLAM 10, the types of alarms and events for which alarm and event sub-window 50b will receive and display notifications. Examples of these events include channel initialization, state change, and termination events, channel connection events, and channel administration events (i.e., rate changes, errors, self-test), and the like. Preferably, the events are displayed by sub-window 50b in connection with the channel identifier, date and time of the event, and identification and description of the event.

Channel capacity sub-window 50c, according to the preferred embodiment of the invention, graphically displays the available channel bandwidth for discrete multi-tone (DMT) modulation. Sub-window 50c is a modeless window, and provides the user with the ability to select the particular channel and a range of tones or bands to be viewed.

Status sub-window 50d is a modeless window that displays both overall performance statistics of DSLAM 10, as well as the characteristics of individual channels selected by the user via main window 48; additionally, such channel status information may be automatically displayed upon the opening of a new DSL channel. The displayed information may include the type of channel, channel connection status, upstream and downstream bit rates, signaling and framing protocols, channel statistics such as the number of frames or bytes transmitted, received, in error, or dropped, and other quality of service (QoS) parameters.

Script command window 50e is a general purpose modeless window by way of which the user may directly enter text commands, as an alternative input means from main window 48 or the other sub-windows 50. In contrast, control command sub-window 50f is a modal window, by way of which user interface module 42 provides user control of DSLAM 10 by way of a graphical user interface. In addition to general DSLAM controls, sub-window 50f permits the user to select channel types, signaling protocol, transmission bit rate, and quality of service, during the initiation of a channel.

Referring now to the case of EMS service application 40e, by way of which host computer 17 carries out the EMS functionality, and with reference to FIGS. 5 and 6, EMS service application 40e includes serial communications module 44e, which is responsible for sending and receiving data to and from the serial port of host computer 17 using serial port driver 46e. As shown in FIG. 6, serial communications module 44e includes message send thread 49 and message receive thread 47.

On the transmit side of serial communications module 44e, message send thread 49 collects and formats control commands from user interface module 42, which are communicated by way of various application program interfaces (APIs) as shown in FIG. 6. API InstallHandle sets a window "handle" for receiving messages in the operating system message queue, effectively associating certain labeled messages with a particular window procedure, which in this example is main window 48 (and its appropriate sub-windows 50) of user interface module 42. API OpenConnection causes communications module 44e to open the associated serial port of host computer 17, specifying the baud rate of the communications and the window handle associated with user interface module 42 for these messages, as installed via API InstallHandle noted above. Message receive thread 47 is then launched as a secondary thread, to monitor the serial port for incoming message data. API CloseConnection is the converse operation of API OpenConnection, closing the serial port in this example. For the sending of data from EMS service application 40e to DSLAM 10, as occurs by the user selecting a control command via control command sub-window 50f or script command sub-window 50e, user interface module 42 sends API SendHostCommand to serial communications module 44e, in which message send thread 49 creates a message packet (the body of which will contain the control command from user interface module 42) that is sent to DSLAM 10, using serial port driver 46e.

Data is received by serial communications module 44e from DSLAM 10 via serial port driver 46e. Message receive thread 47 assembles the incoming data packets into a message format. Upon receipt of a complete packet, message receive thread 47 posts a channel message to operating system message queue 45 with the appropriate window handle (in this case, the handle for user interface module 42) attached thereto. User interface module 42 will respond to the posting of this message from DSLAM 10 by routing the message data to the appropriate sub-window 50; for example, logging messages are forwarded to sub-window 50a, alarms and events are forwarded to sub-window 50b, and status information is forwarded to status window 50d. Channel performance and channel status information communicated from DSLAM 10 is preferably managed by a database function within EMS service application 40e, with the results forwarded to channel capacity sub-window 50c and status window 50d, as appropriate.

Referring back to FIG. 5, the software architecture of DSLAM 10 includes serial port driver 52e, which controls the operation of either or both of serial ports 27, 28 (FIG. 2) in the conventional manner. Host port manager 38b is a higher layer software component that manages the operation of the appropriate one (or both) of serial ports 27, 28, such management including opening and closing the port, associating message handles with the port, setting and clearing events associated with the port, and effecting reads and writes to the port. In this preferred embodiment of the invention, host port manager 38b also transfers those messages associated with EMS functions between EMS service application 40e of host computer 17 and EMS agent 60 in DSLAM 10.

As shown in FIG. 5, the software architecture of EMS agent 60 in DSLAM 10 includes message parsing function 64 and message sending function 66, both of which are in communication with host port manager 38b using APIs associated with the EMS functions. Message parsing function 64 receives command and request messages from EMS service application 40e that are directed to the monitoring and operation of DSLAM 10, and parses the messages as appropriate for forwarding to DSL channel manager 38c in DSLAM 10. Message sending function 66 receives the responsive status or informational replies from DSL channel manager 38c, and arranges messages to be forwarded back to EMS service application 40e.

In operation, a control or request message initiated by EMS service application 40e in host computer 17 will be received by host port manager 38b, following its serial port transmission. Host port manager 38b will forward the message to message parsing function 64 of EMS agent 60 via an API layer. Message parsing function 64 will determine whether the message is a control command message, intended to command DSL channel manager 38c (or some other application 38 in DSLAM 10 such as network manager 38a or host port manager 38b itself) to effect certain operations, or a request message, intended to request certain status or performance information from DSL channel manager 38c (or another application 38). The message type is preferably indicated by way of a message ID field in the communicated message from host port manager 38b; the message also preferably includes flags that indicate whether reply or acknowledgement of the message is requested by EMS service application 40e, the sequence of the message in the overall EMS operation, and an identifier of the particular DSL channel to which the message pertains. The specific protocol of the messaging may be specified according to the particular arrangement and architecture of DSLAM 10, and as such is contemplated to be within the purview of those skilled in the art having reference to this specification.

Message parsing function 64 then issues a control or request to the indicated application 38, which in turn effects the desired operation and returns a requested reply or notification to message sending function 66 in EMS agent 60. For example, a control command or request related to one or more of the DSL channels communicating via DSLAM 10 will be forwarded by message parsing function 64 to DSL channel manager 38c for execution. DSL channel manager 38c will then generate a reply message (for example, in response to a logging request or other request for information regarding DSL performance) or an acknowledgement message (for example, in response to a control command to indicate execution of the command), and issue a message to message sending function 66. Message sending function 66 will then pack the responsive message into the format that is specified by the particular messaging protocol being used for EMS serial port communications, and issue the message, via an API, to host port manager 38b. Host port manager 38b will then generate a message via serial port driver 52e to be transmitted over the serial interface to host computer 17. Serial communications module 44e of EMS service application 40e will then receive the message, and forward it to user interface module 42 for action and display as appropriate.

In this manner, host computer 17 can carry out EMS functions for DSLAM 10 in a wide-ranging and interactive manner. As noted above, these EMS functions include such operations as logging of DSLAM and DSL channel performance, monitoring DSL bandwidth availability, controlling the opening and closing of DSL channels at particular data rates, notification of events and alarm conditions at the DSLAM, and the like.

As shown in FIG. 5, the preferred embodiment of the present invention further includes the ability of user computers U, remotely coupled to DSLAM 10 by way of LAN 14, to also effect EMS monitoring operations over DSLAM 10. In this regard, user computer U of FIG. 5 includes SNMP-EMS service application 40n, and DSLAM 10 includes SNMP agent 62 for cooperatively operating in combination with SNMP-EMS service application 40n, as will now be described in detail.

As is well known in the art, SNMP is a conventional protocol used for the communication of system management information between management systems and agents. Conventional SNMP requests include "Get" and "GetNext" for retrieving information, and "Set" for effecting a control operation. Software agents operating under SNMP are also able to notify a registered management system upon the occurrence of system events.

As shown in FIG. 6, and as typical for SNMP networks SNMP agent 62 in DSLAM 10 includes management information base (MIB) 70 by way of which SNMP managed objects are described. According to SNMP, a management system can manipulate objects stored in the MIB via the SNMP agent; in this example, applications such as DSL channel manager 38c and user interface module 42 of SNMP-EMS service application 40n can manipulate objects in MIB 70 using SNMP requests. Each managed object in the system is described in MIB 70 in association with a unique identifier and descriptive data concerning the object storage type, access type, size, and range. As is known in the field of SNMP, MIB 70 may be either of scalar type as a leaf node, or alternatively of a table type having instances of the objects.

Specifically, for the case of DSLAM 10, MIB 70 corresponds to an ADSL-Line MIB proposed by The ADSL Forum, for example as described in K. McCloghrie, "Management Information Base for Network Management of TCP/IP-based internets: MIB-II", RFC 1213 (Network Working Group), incorporated herein by this reference. The data types managed by MIB 70 in this preferred embodiment of the invention include line-specific data such as line coding type, line status, physical description, channel statistics, channel and system performance, interval information, and various alarms and traps regarding loss of frame, loss of signal, loss of power, rate changes, and initialization failure. These objects (including the data and statistics referenced by such objects) are not themselves expressly stored within MIB 70, but rather MIB 70 is arranged by way of indices that, when called within SNMP agent 62, initiate a routine to acquire the corresponding objects. MIB 70 preferably is arranged to specify detailed data interface attributes between ATUCs and ATURs, as known in the art.

As shown in FIG. 5, SNMP-EMS service application 40n in user computer U communicates with DSLAM 10 by way of a network device driver 46n, and such network elements (LANs 14, 14', router 29) as may be present in the overall system network. According to the preferred embodiment of the invention, SNMP-EMS service application 40n preferably contains sufficient information regarding the contents of MIB 70 so as to be able to request the desired information (by way of execution of a routine, as noted above) by index. Additionally, SNMP-EMS service application 40n must register itself with SNMP agent 60 upon activation so that, upon the occurrence of an event in DSLAM 10, SNMP agent 60 may send an alarm or alert thereto.

Figure 7:
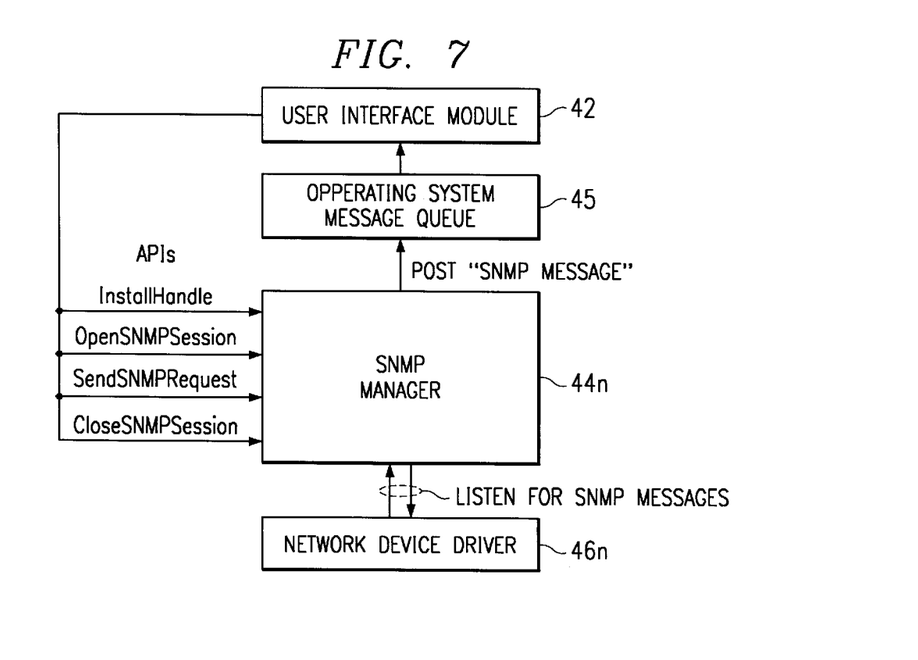
FIG. 7 is a block diagram illustrating the software architecture of the SNMP-EMS service application implemented in a remote, network-connected, user computer according to the preferred embodiment of the invention.

FIG. 7 illustrates the software architecture of modules within SNMP-EMS service application 40n. As noted above, SNMP-EMS service application 40n includes user interface module 42, which is contemplated to be substantially identical to user interface module 42 in EMS service described hereinabove; of course, some differences in the types of monitoring and control functions implemented on user computers U relative to host computer 17 may be modified according to the specific system management to be provided.

SNMP-EMS service application 40n also includes SNMP manager 44n, which operates in connection with user interface module 42, in much the same fashion as serial communications module 44e described hereinabove relative to FIG. 6. In this regard, SNMP manager 44n handles SNMP manager functions in a primary "thread" by providing APIs by way of which user interface module 42 may send requests to SNMP agent 62 in DSLAM 10 over the network. These APIs include, as shown in FIG. 7, the InstallHandle API by way of which a window "handle" is set for receiving messages from operating system message queue 45. Analogously to serial communications module 44e described above, other APIs include API OpenSNMPSession that opens network communication over an open SNMP session, and API CloseSNMPSession that closes the network session. Requests are transmitted by SNMP-EMS service application 40n to DSLAM 10 by user interface module 42 issuing API SendSNMPRequest to SNMP manager 44n; in response to SendSNMPRequest, SNMP manager 44n creates a network message packet that is sent to DSLAM 10 through the operation of network device driver 46n over the network.

Additionally, SNMP manager 44n also launches a secondary thread that will monitor messages received by network device driver 46n from the network, and identify messages indicative of events and alarms that have been sent by SNMP agent 62 to SNMP-EMS service application 40n (once it is registered with SNMP agent 62). This secondary thread of SNMP manager 44n will also forward, to user interface module 42, any reply and acknowledgement messages generated by SNMP agent 62 in response to requests initiated by user interface module 42. When a complete packet of data is received from the network via driver 46n, SNMP manager 44n posts a message to operating system message queue 45 with the window handle for user interface module 42, responsive to which user interface module 42 routes the message data to its appropriate sub-window 50 for the message, as described above.

While SNMP-EMS service application 40n is shown as separately implemented from EMS service application 40e, it is contemplated that both SNMP-EMS service application 40n and EMS service application 40e may be implemented on the same computer, for example by way of a single instance of user interface module 42 in combination with both of serial communications module 44e and SNMP manager 44n, operating in conjunction with operating system message queue 45.

Referring back to FIG. 5, the software architecture of DSLAM 10 includes network device driver 52n, which effects communication between LAN 14 and network manager application 38a. As discussed above relative to FIG. 4, network manager 38a operates in conjunction with data protocol stack 36d to bidirectionally process network messages within DSLAM controller 25. In this example, these network messages are communicated to SNMP agent 62 by way of SNMP APIs that can initialize SNMP agent 62, register SNMP manager 44n with SNMP agent 62, instantiate an entry into and remove an entry from MIB 70, query MIB 70 with a request, and notify SNMP agent 62 of an event or alarm.

As illustrated in FIG. 5, the software architecture of SNMP agent 62 includes MIB 70, in combination with SNMP protocol machine 68 and method routines 72. In its general operation, SNMP protocol machine 68 receives a request from SNMP manager 44n over the network (i.e., LAN 14, etc.) that includes an index into MIB 70. SNMP protocol machine 68 initiates one of method routines 72 based upon the received index, and notifies SNMP manager 44n upon completion of the request. Additionally, assuming that SNMP manager 44n is registered with SNMP agent 62, SNMP protocol machine 68 will issue alerts and alarms thereto upon their issuance by DSL channel manager 38c.

Details regarding the components of SNMP agent 62 will now be described.

Protocol machine 68 encodes SNMP messages to be sent to the network and decodes SNMP messages received from the network. According to the preferred embodiment of the invention, the SNMP protocol corresponds to the ASN.1 description language, with coding effected by way of the Basic Encoding Rules (BER) format. As is known in the art, BER encodes each value to a tag field that describes the information type, a length field indicative of the length of information, and the value field (i.e., the information itself. Further description of the SNMP protocol is provided in Perkins and McGinnis, *Understanding SNMP MIBs* (Prentice Hall, 1997), incorporated herein by reference. In the architecture of SNMP agent 62 shown in FIG. 5, and as is known in the art, SNMP operates as an application on top of User Datagram Protocol (UDP) in the Internet protocol suite. As such, in the receipt of SNMP messages over the network, SNMP protocol machine 68 receives SNMP data packets from the UDP layer (i.e., the APIs), and decodes the SNMP packets under BER to extract information regarding the source of the SNMP message, the SNMP agent address, request types, error status and index, variable bindings that describe the object identifier and values.

MIB 70 describes the entities that are being managed by DSLAM 10, in the form of a data structure having information for each entity registered with SNMP agent 62. Typically, information regarding the management of DSLAM 10 is maintained as an abstraction in MIB 70 and is generated only upon request by SNMP manager 44n, rather than being continually maintained during DSLAM 10 operation.

Management information that is used to modify the operating state of DSLAM 10, such as rate changes and the like, is stored in MIB 70 and presented as arguments to the corresponding one of method routines 72. According to the preferred embodiment of the present invention, MIB 70 is based upon the proposed ADSL-Line MIB structure noted above, preferably by way of a tree structure. In addition to the ADSL information, according to the preferred embodiment of the invention, MIB 70 further includes specific management information such as channel statistics, channel performance, channel status, and DSLAM alarms and events, represented as object identifiers within MIB 70. According to the preferred embodiment of the invention, each DSL channel connection handled by DSLAM 10 is described as a row in a table or an instance in the tree structure, instantiated along with the corresponding DSL channel. Also according to the preferred embodiment of the invention, MIB 70 includes a search method by way of which an SNMP query packet can search MIB 70 to find the appropriate requested entry.

Method routines 72 correspond to software instruction sequences, executable by DSLAM controller 25 within the overall functionality of SNMP agent 62, to respond to queries and requests issued by SNMP manager 44n. According to the preferred embodiment of the invention, method routines 72 operate according to a dispatch table that maps the identity of management information requested by SNMP manager 44n (or by SNMP agent 62 itself in response to an event) to the desired routine; this management information identity preferably includes both the management information itself plus an individual instance in MIB 70 to which it refers.

In operation, SNMP agent 62 receives SNMP messages over the network from SNMP manager 44n, initiated by the user via user interface module 42 of user computer U. These messages are processed by network manager 38 using data protocol stack 36d, and forwarded as SNMP data packets to SNMP protocol machine 68. SNMP protocol machine 68 decodes these SNMP packets to extract the source of the SNMP message, the SNMP agent address, request types, error status and index, variable bindings that describe the object identifier and values. The dispatch table maps the object identities to method routines 72 for execution. Upon execution of the method or upon the occurrence of an event or alarm in DSLAM 10, SNMP protocol machine 68 issues the corresponding SNMP messages back over the network to the registered SNMP manager 44n, by encoding the event or response under BER and formatting the encoded message as SNMP data packets.

For example, SNMP manager 44n may issue a request to DSLAM 10 for the performance statistics of a specific DSL channel, as selected by the user via user interface module 42. The request is driven onto the network by network device driver 46n of user computer U, and is received in the appropriate manner by DSLAM 10 under the operation of network device driver 52n. Network manager 38a forwards the message to SNMP agent 62, within which SNMP protocol machine 68 decodes the SNMP message to determine that the message is a request for DSL channel statistics, along with the identity of the particular DSL channel to be interrogated. This request is forwarded to method routines 72 which maps the request and the object identities to the appropriate method; information contained within the corresponding instance in MIB 70 is then obtained as appropriate, and the method is executed by SNMP agent 62 by issuing a request to DSL channel manager 38a for the appropriate DSL channel statistics. Because of the operation of MIB 70, each managed entity has its own method within method routines 72. DSL channel manager 38a will then issue the appropriate reply to SNMP agent 62, which updates its MIB 70 accordingly and initiates SNMP protocol machine 68 to encode an SNMP message back to requesting SNMP manager 44n. Upon receipt of the reply, user interface module 42 in SNMP-EMS service application 40n will then display the channel statistics to the user as appropriate.

It is of course to be understood that, while a single user computer U is illustrated in FIG. 5, multiple user computers U having SNMP-EMS service application 40n installed thereupon will likely be coupled to DSLAM 10 by way of various network facilities such as LAN 14. As such, multiple SNMP managers 44n will likely be registered with SNMP agent 62 of DSLAM 10, so that monitoring and control requests may be issued by multiple users on the network, and with events and alarms forwarded to such users, depending on the level of management desired.

In combination with the overall EMS function provided according to the present invention, therefore, the preferred embodiment of the invention permits users to monitor and manage the DSLAM system both locally by way of the EMS functionality of a host computer, or remotely by way of a network connection. As a result, great flexibility and functionality in the management, control, and monitoring of the DSLAM is provided by the present invention. Furthermore, it is contemplated that the EMS of the present invention also facilitates debugging of a DSLAM installation, particularly by way of the host computer. Other functionality is also now enabled through the intelligent EMS of the present invention, including the ability to download and install upgraded client modem software from the EMS systems via the DSLAM.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

We claim:

1. An access multiplexer system for processing data communications, comprising:
   a multiplexer, comprising:
      a plurality of interface circuits, each for coupling the multiplexer to a communications facility for the bidirectional communication of data with a client location;
      signal processing circuitry, for performing digital operations upon data corresponding to signals received from client locations by way of the plurality of interface circuits and corresponding to signals to be transmitted to client locations by way of the plurality of interface circuits;
      a network interface;
      a local communications interface; and
      a controller, coupled to the signal processing circuitry, to the network interface, and to the local communications interface, for controlling the communications between the signal processing circuitry and the network interface and for managing communications channels established at the plurality of interface circuits according to an element management system agent responsive to control command and information request messages received from the local communications interface, and for generating reply messages to the local communications interface responsive to said control command and information requests; and
   a host computer, coupled to the local communications interface, programmed to execute an element management system service application to receive user inputs corresponding to management functions of the access multiplexer system, to generate control command and information request messages in response to such user inputs and output said control command and information request messages at the local communications interface, and to generate display information corresponding to reply messages received at the local communications interface.

2. The access multiplexer system of claim 1, further comprising a local area network coupled to the network interface of the multiplexer.

3. The access multiplexer system of claim 2, further comprising an Internet gateway coupled to the local area network.

4. The access multiplexer system of claim 2, further comprising:
   a user computer, coupled to the local area network, and programmed to execute a network protocol element management system service application to receive user inputs corresponding to management functions of the access multiplexer system, to generate control command and information request messages in response to such user inputs and output said control command and information request messages to the local area network, and to generate display information corresponding to reply messages received at the local area network;
   wherein the controller of the multiplexer is also for managing communications channels established at the plurality of interface circuits according to a network protocol agent responsive to control command and information request messages received from the network interface, and for generating reply messages to the network interface responsive to said control command and information requests.

5. The multiplexer system of claim 4, wherein the controller comprises a programmable device operable according to a plurality of software elements comprising:

a communications channel manager, for initializing and dropping communications channels, and for defining communications parameters for the communications channels;

a host port manager for controlling communications over the local communications interface; and a network manager for controlling communications over the network interface;

wherein the controller operates according to the element management system agent to cause the communications channel manager to execute operations responsive to control commands and requests received at the local communications interface by the host port manager, and operates according to the network protocol agent to cause the communications channel manager to execute operations responsive to control commands and requests received at the network interface by the network manager.

6. The multiplexer system of claim 1, wherein the communications between the multiplexer and client locations are digital subscriber line communications.

7. The multiplexer system of claim 1, wherein the controller comprises a digital signal processor integrated circuit.

8. The multiplexer system of claim 1, wherein the local communications interface is a serial interface.

9. A method of controlling communications at an access multiplexer coupled to a plurality of client locations, and coupled to a network, comprising the steps of:

receiving a command control request at a host computer;

operating the host computer to communicate a command control request message to the access multiplexer over a local communications interface;

responsive to receiving the command control request message, parsing the command control request message within an element management system software agent;

operating the element management system software agent to cause a communications channel manager to execute the corresponding command control request and generate a reply;

receiving the reply at the element management software agent; and generating a reply message to the host computer over the local communications interface.

10. The method of claim 9, further comprising:

receiving a command control request at a user computer;

operating the user computer to communicate a command control request message to the access multiplexer over a local area network;

responsive to receiving the command control request message, decoding the command control request message within an network protocol software agent;

calling a method routine in the network protocol software agent corresponding to the command control request message;

causing the communications channel manager to execute the method routine called in the calling step;

encoding a reply at the network protocol software agent, corresponding to a result of the executed method routine; and generating a reply message to the user computer over the local area network.

11. The method of claim 10, wherein the command control request corresponds to the establishing of a communications channel at the multiplexer.

12. The method of claim 10, wherein the command control request corresponds to the setting of a state of a communications channel at the multiplexer.

13. The method of claim 10, wherein the command control request corresponds to a request for performance information regarding a selected communications channel at the multiplexer.

14. The method of claim 10, wherein the command control request corresponds to a downloading of communications software to a device at a client location.

15. The method of claim 10, further comprising:

responsive to the multiplexer operating at an alarm condition, operating the communications channel manager to issue an alarm to the element management system software agent; and responsive to receiving the alarm, operating the element management system software agent to generate an alarm message to the host computer over the local communications interface.

16. The method of claim 10, further comprising:

responsive to the multiplexer operating at an alarm condition, operating the communications channel manager to issue an alarm to the network protocol software agent; and responsive to receiving the alarm, operating the software agent to generate an alarm message to the user computer over the local area network.

* * * * *